United States Patent [19]
Schetelig et al.

[11] Patent Number: 6,044,118
[45] Date of Patent: Mar. 28, 2000

[54] METHOD FOR ADJUSTING THE FREQUENCY OF AN OSCILLATOR FOR A RECEIVER CIRCUIT

[75] Inventors: Markus Schetelig, Essen; Jan Pingel; Jürgen Hess, both of Bochum, all of Germany

[73] Assignee: Nokia Mobile Phones Limited, Espoo, Finland

[21] Appl. No.: 08/851,369

[22] Filed: May 5, 1997

[51] Int. Cl.[7] .................................................. H04L 27/06
[52] U.S. Cl. .......................................... 375/344; 455/257
[58] Field of Search ..................................... 375/344, 371, 375/373; 455/257, 265; 370/347, 442

[56] References Cited

U.S. PATENT DOCUMENTS

| | | | |
|---|---|---|---|
| 4,466,108 | 8/1984 | Rhodes | 375/344 |
| 5,073,973 | 12/1991 | Ylivakeri | 455/76 |
| 5,115,515 | 5/1992 | Yamamoto et al. | 455/265 |
| 5,317,600 | 5/1994 | Kansakoski | 375/97 |
| 5,335,364 | 8/1994 | Heinonen | 455/76 |
| 5,400,362 | 3/1995 | Chennakeshu et al. | 370/347 |
| 5,434,889 | 7/1995 | Baier | 375/344 |
| 5,610,949 | 3/1997 | Petranovich | 375/330 |
| 5,625,652 | 4/1997 | Petranovich | 375/355 |

FOREIGN PATENT DOCUMENTS 172418  4/1993  Norway .

*Primary Examiner*—Tesfaldet Bocure
*Attorney, Agent, or Firm*—Perman & Green, LLP

[57] ABSTRACT

A method for adjusting the frequency of an oscillator for a receiver circuit comprising: downconverting a received signal to generate a downconverted signal, counting the number of zero crossings of the downconverted signal over a predefined time interval, determining a correction number of zero crossings based on the data of the downconverted signal over the predefined time interval, determining a corrected number of zero crossings for the received signal based on the counted number of zero crossings and the correction number of zero crossings, adjusting the frequency of the oscillator based on the corrected number of zero crossings.

10 Claims, 3 Drawing Sheets

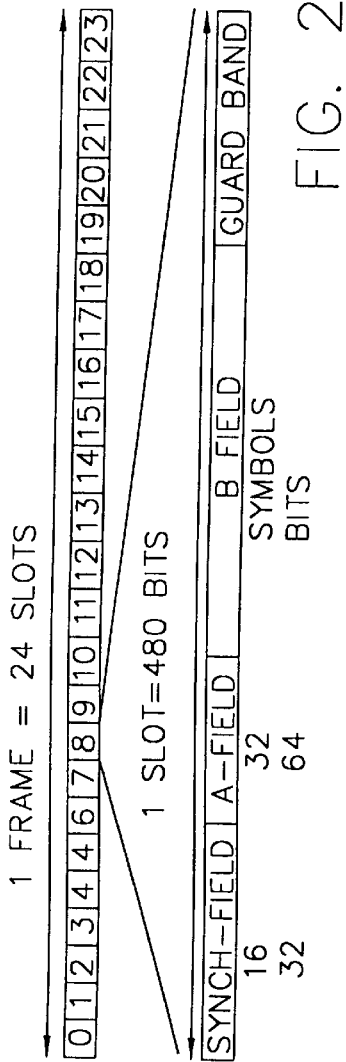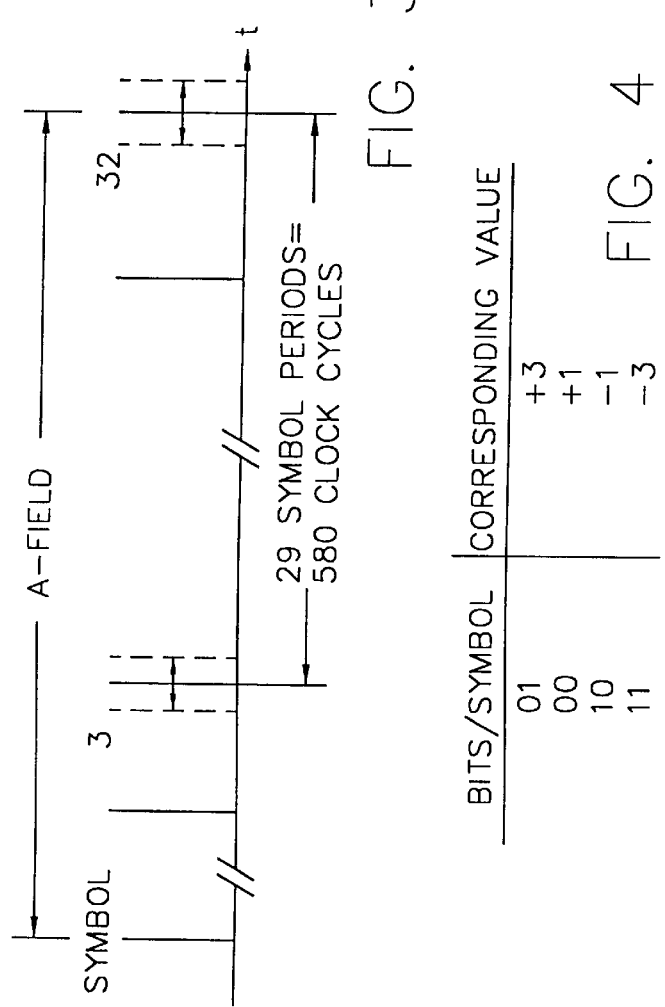

METHOD FOR ADJUSTING THE FREQUENCY OF AN OSCILLATOR FOR A RECEIVER CIRCUIT

BACKGROUND OF THE INVENTION

The present invention is generally related to radio transceivers and more particularly related to an improved method and a corresponding circuit to adjust the frequency of an oscillator which controls the frequency synthesis within a receiver circuit.

With regard to cost reduction, low cost crystal oscillators instead of expensive temperature compensated crystal oscillators (TCXO) are used to generate the frequency of a reference oscillator for transceivers. In the particular case of usage of none temperature compensated crystal oscillators frequency accuracy improvement in general with additional circuitry is necessary to compensate the frequency deviation of the oscillator.

In the prior art methods are known to control the frequency of a reference oscillator by counting the zero crossings of a received and downconverted signal for a predefined time. The average number of zero crossings to be expected is known in such systems. The deviation of the expected number of zero crossings to the counted number of zero crossings will be calculated and a corresponding output value is generated. This digital output value is given to a Digital to Analogue Converter and the resulting analogue signal is used to control the frequency of the reference oscillator.

A known method to control the frequency synthesis of the reference oscillator is described in NO 172418 as follows.

After downconversion and hard limiting a received signal will be given to a counter that counts the number of zero crossings for a predefined time interval. The length of this time interval is a multiple of the system clock cycle that is derived from the voltage controlled crystal oscillator (VCO) frequency via a Phase Locked Loop circuit (PLL). The Master Control Unit (MCU) of the device computes the frequency deviation of the voltage controlled crystal oscillator (VCO) from the difference between counted and expected number of zero crossings and generates an output value. A digital to analogue converter (DAC) converts this value into a corresponding analogue voltage that controls the frequency of the crystal oscillator. The expected number of zero crossings is related to the nominal, unmodulated intermediate frequency of the downconverted signal.

The counted number of zero crossings depends on the actual intermediate frequency that is generated from the received Radio Frequency Signal by means of the mixer frequencies. Since the mixer frequencies are derived from the crystal frequency, the difference between the counted and expected number of zero crossings is an indicator for the frequency deviation of the crystal.

If, for example, a system with π/4 DQPSK modulation is used, the instantaneous frequency depends on the transmitted data. In order to eliminate the influence of the modulation counting for a relatively long time interval is necessary to obtain a usable value to control the frequency of the reference oscillator.

For the case that the received signal contains non random data or bits representing only 0's or 1's in the data bit stream this method fails because the expected number of zero crossings can only be based on a signal where the bits are well balanced like in random data fields. In fact the presently used data transmission methods contain partly non random and random data.

Therefore it is an object of the present invention to obtain an automatic frequency control algorithm which eliminates the disadvantages described above.

SUMMARY OF THE INVENTION

According to the present invention there is provided a method for adjusting the frequency of an oscillator for a receiver circuit comprising the following steps:

downconverting a received signal to generate a downconverted signal;

counting the number of zero crossings of the downconverted signal over a predefined time interval;

determining a correction number of zero crossings based on the data of the downconverted signal over the predefined time interval;

determining a corrected number of zero crossings for the received signal based on the counted number of zero crossings and the correction number of zero crossings adjusting the frequency of the oscillator based on the corrected number of zero crossings.

Since the instantaneous frequency of the received and downconverted signal depends on the transmitted data, the disclosed Automatic Frequency Control algorithm (AFC) uses information of the detected data to correct the counted number of zero crossings by the additional modulation caused zero crossings which are calculated within a mapping unit. This correction value will be added to the counted number of zero crossings for the predefined time interval within a Micro Controller Unit MCU containing the Automatic Frequency Control unit AFC which can generate a value with higher accuracy within a shorter counting period that will be used to control the frequency of the reference oscillator. The oscillation frequency of the reference oscillator is roughly adjusted by a voltage controlled capacitor (varactor diode) inside the oscillator. The fine tuning will be made based on the corrected number of zero crossings with a voltage provided by a Digital to Analogue converter.

According to another refinement of the invention the length of the predefined time interval is an integral multiple of the system clock period.

According to a further refinement of the invention the system clock period is derived from the oscillator frequency in order to define the predefined time interval.

In another advantageous refinement of the invention the received signal for the predefined time is represented by one field within one Time Division Multiple Access-(TDMA-) slot. This field might be the so called A-field if the invention is used in the US standard for cordless telephony PWT (Personnel Wireless Telecommunications).

In a further advantageous embodiment of the invention the corrected value of number of zero crossings is averaged over two or more data fields (TDMA-slots) before the frequency deviation of the crystal oscillator is determined.

After a certain number of processed counting periods the average value of the corrected number of zero crossings is used for the computation of an average value of the estimated relative frequency deviation. Hereby the computational effort is decreased against known algorithms where the complete AFC algorithm is processed after each counting interval.

According to the present invention there is also provided a circuit comprising means to carry out the method according to the invention described above.

BRIEF DESCRIPTION OF THE DRAWINGS

The present invention will now be described by way of example, with reference to the accompanying drawings, in which:

FIG. 2 shows a frame structure used in digital cordless telephone applications;

FIG. 3 shows one field of the frame structure from FIG. 2 with the preferred counting period;

FIG. 4 shows the mapping rule to compute the correction value;

DETAILED DESCRIPTION OF THE INVENTION

Figure 1:
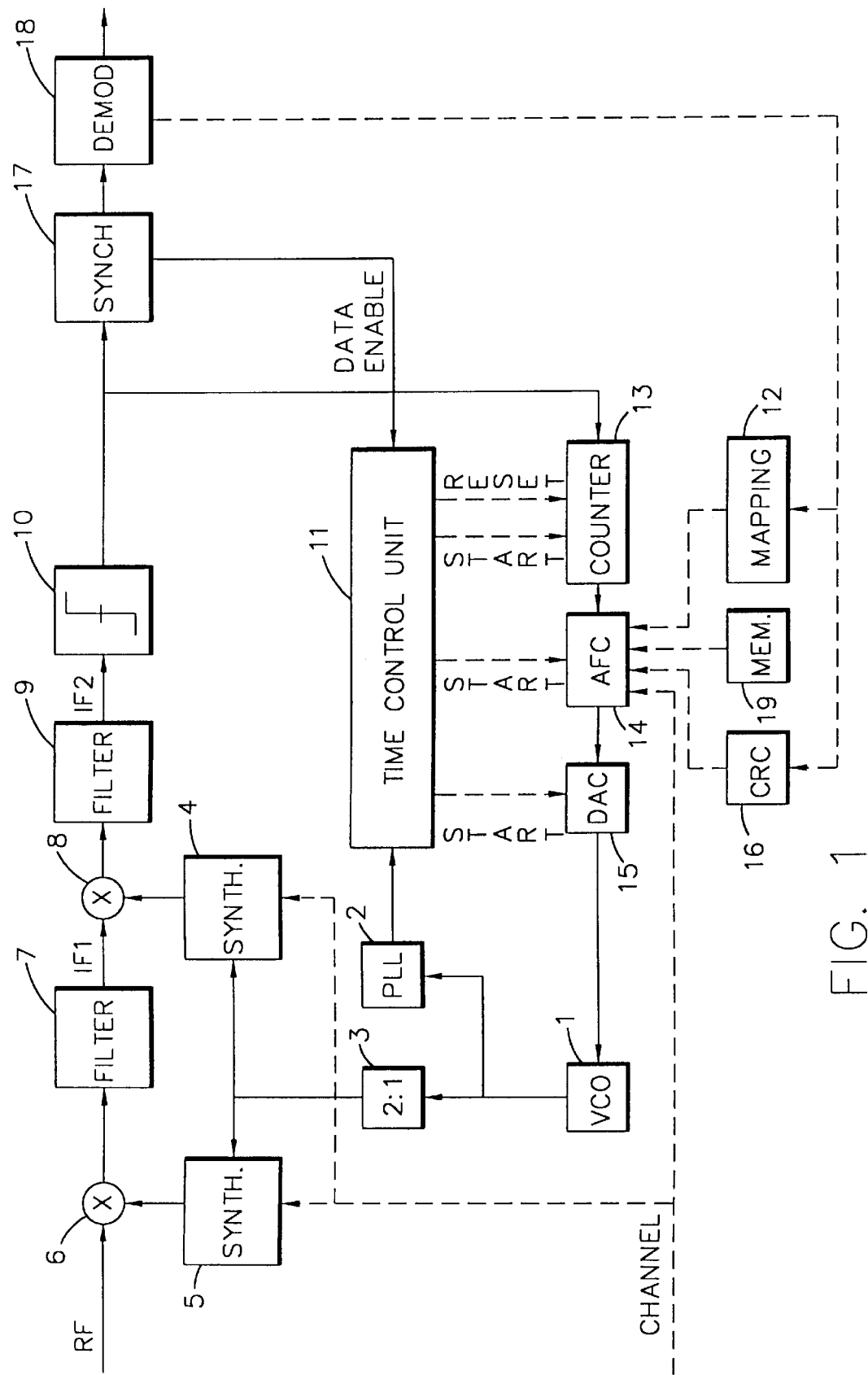
FIG. 1 is a block diagram of a receiver embodying the disclosed AFC control loop.

FIG. 1 shows a block diagram of a receiver embodying the Automatic Frequency Control (AFC) loop. The received Radio Frequency signal RF will be downconverted by the mixers 6, 8 and filtered by the bandpass filters 7,9. The mixers 6,8 receive the frequency for downconversion from the frequency synthesisers 4,5. The frequency synthesisers 4,5 are controlled via a divider 2 by a Voltage Controlled Oscillator VCO 1.

The oscillating circuit within the VCO 1 contains a capacitor in parallel or in series to a variable capacitor Diode (Varactor Diode) which is not shown in this figure. The oscillation frequency of the Voltage Controlled Oscillator is roughly adjusted by the capacitor in the circuit (for example 7.5 MHz). The fine tuning will be made by a voltage provided by the Digital to Analogue Converter (DAC) 15 which influences the capacity of the varactor diode inside the VCO 1. For example for a voltage provided by the DAC 15 from 0 Volt up to 2 Volt the frequency of the VCO 1 can be tuned between 7.5 MHz−15 ppm up to 7.5 MHz+15 ppm. The VCO 1 also contains a not shown reference quartz.

Furthermore the frequency synthesisers 4,5 receive channel information which controls the divider ratio of the downconversion frequency.

The received signal is first downconverted to the intermediate frequency IF1 with the mixer 6 and then downconverted to the intermediate frequency IF2 with mixer 8.

The output signals of the mixers 6,8 are filtered at the bandpass filters 7 and 9. Afterwards this signal is limited by means of the hardlimiter 10.

On a first path the hardlimited IF2 signal passes a synchronisation unit 17 before it is demodulated by a demodulator 18.

In order to better understand the principles of the present invention concurrent reference is made to FIG. 2, which represents the frame structure for a TDMA (Time Division Multiple Access) system like DECT (Digital European Cordless Telephone) and PWT (Personnel Wireless Telecommunications ), which is known by persons skilled in the art.

One frame contains 24 slots (0–23), twelve slots (0–11) are used for the downlink from the base station to the mobile station and the other twelve slots (12–24) are used for the uplink from the mobile station to the base station.

Every time slot within this frame contains a synchronisation field Synch-field which is used to obtain a synchronous data transmission between a base station and a mobile station.

After the Synch-field the so called A field and B field will follow which contain the information to be transmitted between the mobile station and the base station.

The last field within one time slot is the guard band which is introduced to take care that no overlap will occur between the time slots within the frame.

Referring now again to FIG. 1 the synchronisation unit 17 sends on a first path a data enable signal at the beginning of the A-field to the Time Control Unit 11 after it has recognised the Synch-field. The counting period mentioned above starts. The Synch unit 17 sends a data disable signal to the Timing Control Unit 11 when the end of the A Field is reached.

After successful synchronisation and demodulation the demodulation unit 18 delivers the A field data (FIG. 3), a total of 64 bits per frame corresponding to the 32 A field symbols of the interesting burst to the mapping unit 12. Due to a belated start of the counter 13, which is described below, the first six bits respectively three symbols of each packet are not taken into account. From the residual 58 bits or 29 symbols the mapping is done as follows:

for symbol 4 to symbol 32 of the A-field assign the corresponding integer value to each symbol according to the mapping rule shown in FIG. 4 compute sum of all 29 values multiply the result with 0.25

The final result of the calculation of the mapping unit 12 represents the modulation caused zero crossings of the received signal and is accessible from the AFC unit 14. This result can have a positive or negative sign.

On a second path the hardlimited IF2 signal is delivered to a counter 13. The counter 13 starts the counting period when the time control unit 11 receives the data enable signal from the synchronisation unit 17. The counter starts counting with a delay of three symbols. This is the reason for the mapping unit 12 to start the mapping process also with a delay of three symbols as mentioned above. The counter 13 stops counting when the TCU 11 sends the stop signal after the TCU 11 has received the data disable signal from the synchronisation unit 17. The counter will be reseted by the Timing Control Unit 11 after each counting period.

The AFC unit 14 receives the following signals:

begin values from a Memory 19 a start and stop signal from the synchronisation unit 17 via the TCU 11 a signal from the CRC check unit 16 that no error within the A-field is detected information about the used transmission frequency, i.e. the used transmission channel the counted number of zero crossings from the counter 17 for symbol 4 to 32 of the A field the modulation caused number of additional zero crossings from the mapping unit 12 for symbol 4 to 32 of the A field The AFC unit 14 computes a corrected value for the Digital to Analogue Converter 15 who provides the Voltage Controlled Oscillator VCO 1 with the corrected value.

The corrected signal for the VCO is derived from the difference between counted and expected number of zero crossings. Since the instantaneous frequency of the output of the hardlimiter depends on the transmitted data, the AFC unit 14 uses information of the likely transmitted symbols to free the counted number of zero crossings from additional modulation caused zero crossings.

Due to limited computing time of the whole system it is not recommendable to process the complete AFC algorithm within each transmitted frame. Therefore it is another advantageous embodiment of the present invention only to compute the correct number of zero crossings per received A-field and to accumulate these values. After a predefined number of processed calculations, this may be preferably 64 or 128, the average value of the corrected number of zero crossings is used for the computation of an average value of the estimated relative frequency deviation.

Figure 5:
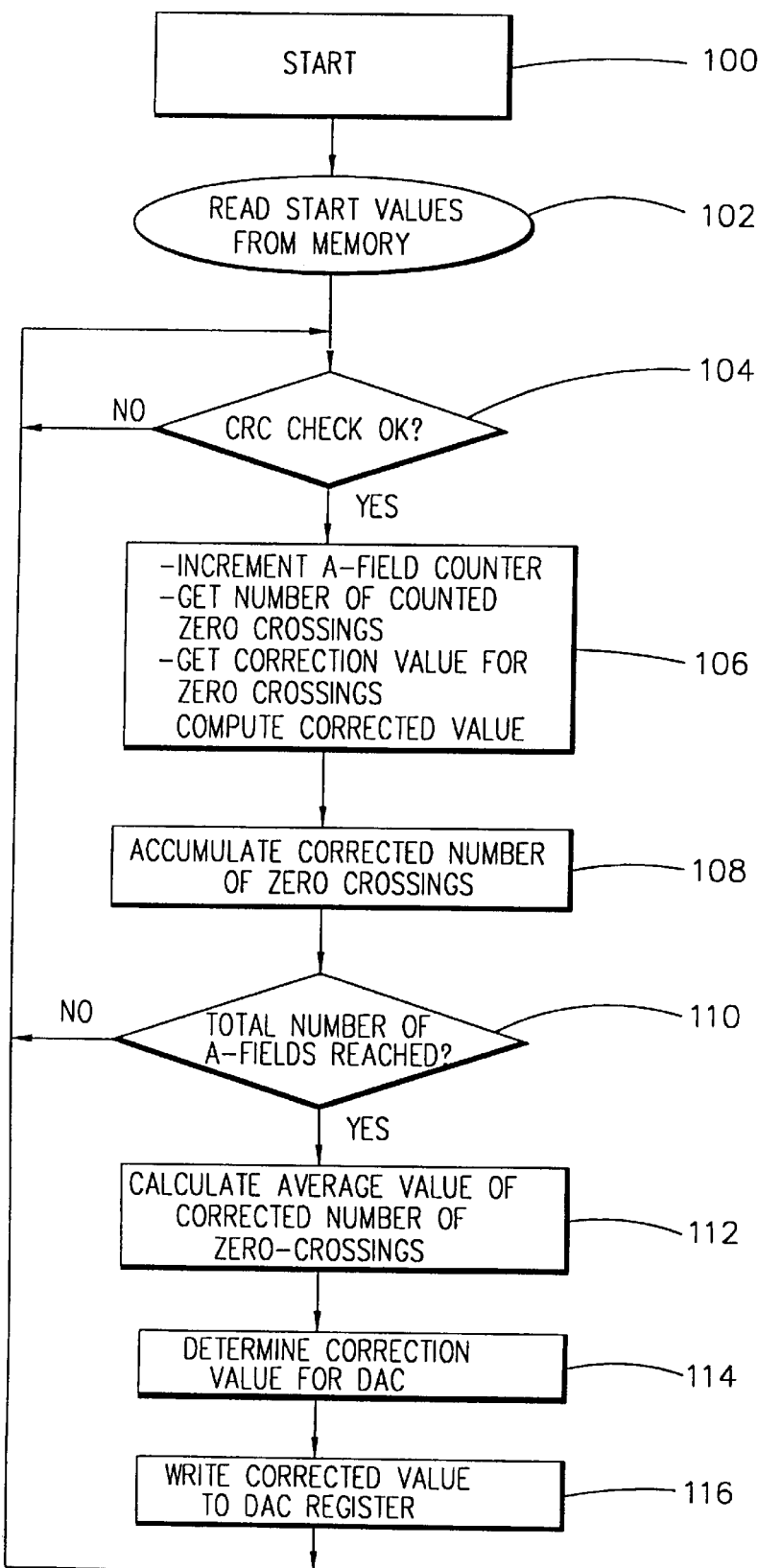
FIG. 5 shows a flow chart for the software implementation of the algorithm.

In order to explain this advantageous embodiment of the present invention reference to FIG. 5 is made. This figure shows the flow chart for the main loop within the AFC unit 14.

The AFC Unit 14 starts working on receiving a start signal from the Timing Control Unit 14 in step 100.

In step 102 the AFC unit 14 reads out the start values from the memory 19.

The CRC unit 16 checks if the demodulated signal from the Demodulator 18 is correct. If the CRC unit 16 sends the signal that the CRC check was not successful the AFC Unit 14 remains in the loop in step 104 until the CRC check is OK.

When the CRC gives a signal that the CRC was successful the AFC unit goes forward to step 106.

Within step 106 the AFC increments the A field counter, gets the number of counted zero crossings from counter 14 and the correction value for the number of zero crossings from the mapping unit 12 and calculates the corrected number of zero crossings.

In step 108 the AFC unit 14 accumulates the corrected number of zero crossings.

In step 110 the AFC unit determines whether the total number of A fields is reached. This may be advantageously 64 or 128 as explained above. If this number is not reached the AFC unit proceeds with step 104.

If the total number of A Fields is reached the AFC unit 14 proceeds with step 112. Within step 112 the average value of corrected number of zero crossings is determined. The AFC unit then determines a corrected value for the DAC 13 in step 114.

The corrected value will be delivered to the DAC 13 in step 116 who now can provide the Voltage Controlled Oscillator 1 with the correct voltage in order to supply the downconversion path 6,7,8,9,10 with the correct frequency to downconvert the received Radio Frequency signal RF.

The present invention may include any novel feature or combination of features disclosed herein either explicitly or implicitly or any generalisation thereof irrespective of whether or not it relates to the presently claimed invention or mitigates any or all of the problems addressed. In view of the foregoing description it will be evident to a person skilled in the art that various modifications may be made within the scope of invention.

What is claimed is:

1. A method for adjusting the frequency of an oscillator for a receiver circuit comprising:

downconverting a received signal to generate a downconverted signal counting the number of zero crossings of the downconverted signal over a predefined time interval determining a correction number of zero crossings based on the data of the downconverted signal over the predefined time interval determining a corrected number of zero crossings for the received signal based on the counted number of zero crossings and the correction number of zero crossings adjusting the frequency of the oscillator based on the corrected number of zero crossings.

2. A method for adjusting the frequency of an oscillator as claimed in claim 1 wherein the length of the predefined time interval is an integral multiple of the system clock period.

3. A method as claimed in claim 1, wherein, in order to define the predefined time interval, the system clock period is derived from the oscillator frequency.

4. A method for adjusting the frequency of an oscillator as claimed in claim 1 wherein the received signal for the predefined time is represented by one field within one Time Division Multiple Access (TDMA)-slot.

5. A method for adjusting the frequency of an oscillator as claimed in claim 2 wherein the corrected value of number of zero crossings is averaged over two or more data fields (TDMA-slots) before the frequency deviation of the crystal oscillator is determined.

6. A circuit for adjusting the frequency deviation of an oscillator for a receiver circuit comprising:

means to downconvert a received signal to generate a downconverted signal a counter counting the number of zero crossings of the downconverted signal over a predefined time interval means to determine a correction number of zero crossings based on the data of the downconverted signal over the predefined time interval means to determine a corrected number of zero crossings based on the counted number of zero crossings and the correction number of zero crossings means to adjust the frequency of the oscillator based on the corrected number of zero crossings.

7. A circuit for adjusting the frequency of an oscillator as claimed in claim 6 wherein the length of the predefined time interval is an integral multiple of the system clock period.

8. A circuit as claimed in claim 6, wherein, in order to define the predefined time interval, the system clock period is derived from the oscillator frequency.

9. A circuit for adjusting the frequency of an oscillator as claimed in claim 6, wherein the received signal for the predefined time is represented by one field within one Time Division Multiple Access (TDMA)-slot.

10. A circuit for adjusting the frequency of a crystal oscillator as claimed in claim 6, wherein the corrected value of number of zero crossings is averaged over two or more data fields before the frequency deviation of the crystal oscillator is determined.

* * * * *

UNITED STATES PATENT AND TRADEMARK OFFICE
CERTIFICATE OF CORRECTION

PATENT NO. : 6,044,118
DATED : 3/28/00
INVENTOR(S) : Markus Schetelig; Jan Pingel; Jurgen Hess It is certified that error appears in the above-identified patent and that said Letters Patent is hereby corrected as shown below:

Col. 6, line 20, Claim 5, "2" should read --1--.

Signed and Sealed this

Twentieth Day of February, 2001

Attest:

NICHOLAS P. GODICI

Attesting Officer     Acting Director of the United States Patent and Trademark Office